(12) United States Patent
McDuff et al.

(10) Patent No.: US 9,044,110 B2
(45) Date of Patent: Jun. 2, 2015

(54) HANGER FOR HOLLOW WALLS

(75) Inventors: Pierre McDuff, Outremont (CA); Alexandre Pollak, Laval (CA); Lang Nguyen, Dollard-des-Ormeaux (CA)

(73) Assignee: Cobra Anchors Co. Ltd., Montreal (CA)

( * ) Notice: Subject to any disclaimer, the term of this patent is extended or adjusted under 35 U.S.C. 154(b) by 37 days.

(21) Appl. No.: 13/129,681

(22) PCT Filed: Nov. 18, 2009

(86) PCT No.: PCT/CA2009/001669
§ 371 (c)(1),
(2), (4) Date: Sep. 19, 2011

(87) PCT Pub. No.: WO2010/057306
PCT Pub. Date: May 27, 2010

(65) Prior Publication Data
US 2012/0001040 A1    Jan. 5, 2012

Related U.S. Application Data

(60) Provisional application No. 61/193,331, filed on Nov. 18, 2008.

(51) Int. Cl.
*A47B 96/06* (2006.01)
*A47G 1/20* (2006.01)

(52) U.S. Cl.
CPC ...................................... *A47G 1/20* (2013.01)

(58) Field of Classification Search
CPC ........... A47G 1/20; A47G 7/044; F16B 2/248

USPC .......... 248/216.1, 217.1, 217.3, 218.1–218.3, 248/546, 547, 684; 411/450, 451.2, 452, 411/485
See application file for complete search history.

(56) References Cited

U.S. PATENT DOCUMENTS

| 165,206 | A | | 7/1875 | Brown |
| 365,725 | A | | 6/1887 | Buckland |
| 600,255 | A | * | 3/1898 | Breul .......................... 248/217.1 |
| 738,074 | A | | 9/1903 | Schick |
| 739,512 | A | | 9/1903 | Stannard |

(Continued)

FOREIGN PATENT DOCUMENTS

| CA | 1164333 | 3/1984 |
| CA | 2252173 | 4/2000 |

(Continued)

OTHER PUBLICATIONS

Cobra Fixations Cie Ltee—Cobra Anchors Ltd. et al, International Search Report from PCT/CA2009/001669, Jan. 26, 2010, Canadian Intellectual Property Office, Gatineau, Quebec, CA.

(Continued)

*Primary Examiner* — Gwendolyn Baxter
(74) *Attorney, Agent, or Firm* — Nixon Peabody LLP

(57) ABSTRACT

An anchoring system for use with hollow panels, comprises an anchor member and a separate fixture, which are adapted to be mounted together. The anchor member includes an elongated element, such as a wire, adapted to be inserted into and partly through a hollow panel, such as a wall, and to bear against a rear surface of the panel. The fixture is adapted to bear against a front surface of the panel for securing the anchoring system to the panel.

30 Claims, 16 Drawing Sheets

(56) References Cited

U.S. PATENT DOCUMENTS

| | | | |
|---|---|---|---|
| 745,722 A | 12/1903 | Jung | |
| 1,100,170 A | 6/1914 | Brosius | |
| 1,115,800 A * | 11/1914 | Froberg | 248/489 |
| 1,132,414 A | 3/1915 | White | |
| 1,159,420 A | 11/1915 | Rubly | |
| 1,161,268 A | 11/1915 | Tuck | |
| 1,185,587 A | 5/1916 | Bragg | |
| 1,210,610 A | 1/1917 | Dehn | |
| 1,333,692 A | 3/1920 | Wester | |
| 1,389,540 A | 8/1921 | Washington | |
| 1,409,291 A | 3/1922 | Giroux | |
| 1,573,557 A | 2/1926 | Alexander | |
| 1,637,981 A | 8/1927 | Baldwin | |
| 1,670,398 A | 5/1928 | Silvino | |
| 1,676,197 A | 7/1928 | Marrinan | |
| 1,780,474 A | 11/1930 | Glazer | |
| 1,802,934 A | 4/1931 | Balch | |
| 1,999,575 A | 4/1935 | Reuter et al. | |
| 2,193,306 A | 3/1940 | Tinnerman | |
| 2,282,631 A | 5/1942 | Winship | |
| 2,339,841 A | 1/1944 | Deuchler et al. | |
| D170,196 S | 8/1953 | Gries | |
| 2,698,470 A | 1/1955 | Buedingen | |
| 2,751,807 A | 6/1956 | Harre | |
| 2,883,946 A | 4/1959 | Kleef | |
| 2,908,196 A | 10/1959 | Apfelzweig | |
| 2,916,235 A | 12/1959 | Nagel | |
| 3,020,602 A | 2/1962 | Siering | |
| 3,127,807 A | 4/1964 | Modrey | |
| 3,143,915 A | 8/1964 | Tendler | |
| 3,248,994 A | 5/1966 | Mortensen | |
| 3,268,195 A | 8/1966 | Hoffman | |
| 3,282,547 A | 11/1966 | Ables | |
| 3,288,014 A | 11/1966 | Aackersberg | |
| 3,298,651 A | 1/1967 | Passer | |
| 3,618,447 A | 11/1971 | Goins | |
| 3,645,163 A | 2/1972 | Byland | |
| 3,707,898 A | 1/1973 | Holly | |
| 3,752,030 A | 8/1973 | Steurer | |
| 3,861,631 A | 1/1975 | Shorin | |
| 3,879,006 A | 4/1975 | Staudte, Jr. | |
| 3,891,176 A | 6/1975 | Downing et al. | |
| 3,912,211 A | 10/1975 | Topf | |
| 3,926,394 A | 12/1975 | Mauceri et al. | |
| 3,966,157 A | 6/1976 | Corral et al. | |
| 4,043,245 A | 8/1977 | Kaplan | |
| 4,075,924 A | 2/1978 | McSherry et al. | |
| 4,120,231 A | 10/1978 | Neumayer | |
| 4,181,061 A | 1/1980 | McSherry | |
| D259,700 S | 6/1981 | Chasen | |
| 4,274,324 A | 6/1981 | Giannuzzi | |
| 4,285,264 A | 8/1981 | Einhorn | |
| 4,286,497 A | 9/1981 | Shamah | |
| 4,294,156 A | 10/1981 | McSherry et al. | |
| 4,300,745 A | 11/1981 | Peterson | |
| 4,325,528 A | 4/1982 | Martin | |
| 4,406,108 A | 9/1983 | Beck et al. | |
| 4,422,608 A | 12/1983 | Hogg | |
| 4,485,995 A * | 12/1984 | Hogg | 248/218.1 |
| 4,509,713 A | 4/1985 | Hogg | |
| 4,573,844 A | 3/1986 | Smith | |
| 4,613,108 A | 9/1986 | Sundstrom et al. | |
| 4,619,430 A | 10/1986 | Hogg | |
| 4,650,386 A | 3/1987 | McSherry et al. | |
| 4,664,350 A | 5/1987 | Dodds et al. | |
| 4,697,969 A | 10/1987 | Sparkes | |
| 4,719,917 A | 1/1988 | Barrows et al. | |
| 4,821,992 A | 4/1989 | Johnson | |
| 4,822,226 A | 4/1989 | Kennedy | |
| D301,975 S | 7/1989 | Mullen | |
| 4,871,140 A | 10/1989 | Hoskinson et al. | |
| 5,028,030 A | 7/1991 | Lewis | |
| 5,059,077 A | 10/1991 | Schmid | |
| 5,067,864 A | 11/1991 | Dewey et al. | |
| 5,149,037 A | 9/1992 | Smith | |
| 5,215,418 A | 6/1993 | Trainer et al. | |
| 5,221,169 A | 6/1993 | McSherry et al. | |
| 5,236,293 A | 8/1993 | McSherry et al. | |
| D339,980 S | 10/1993 | Sheehan | |
| 5,267,718 A | 12/1993 | Sheehan | |
| 5,267,719 A | 12/1993 | Keller | |
| 5,308,203 A | 5/1994 | McSherry et al. | |
| 5,322,401 A | 6/1994 | Vernet | |
| 5,437,429 A | 8/1995 | Atlas | |
| 5,529,449 A | 6/1996 | McSherry et al. | |
| 5,536,121 A | 7/1996 | McSherry | |
| 5,584,462 A | 12/1996 | Reese | |
| 5,596,792 A | 1/1997 | Shelton | |
| 5,702,218 A | 12/1997 | Onofrio | |
| 5,725,302 A | 3/1998 | Sirkin | |
| 5,752,792 A | 5/1998 | McSherry | |
| 5,755,545 A | 5/1998 | Banks | |
| 5,833,415 A | 11/1998 | McSherry | |
| D404,287 S | 1/1999 | Hepworth | |
| 5,876,169 A | 3/1999 | Wrigley | |
| 5,878,988 A | 3/1999 | Rakower | |
| D409,082 S | 5/1999 | Donahue | |
| 5,944,295 A | 8/1999 | McSherry | |
| D417,385 S | 12/1999 | Bries et al. | |
| 6,036,149 A | 3/2000 | Del Pino et al. | |
| D424,816 S | 5/2000 | Snell | |
| 6,126,126 A | 10/2000 | McKiernan, Jr. | |
| 6,250,865 B1 | 6/2001 | McSherry | |
| 6,279,862 B1 | 8/2001 | Gershowitz | |
| D457,419 S | 5/2002 | McSherry et al. | |
| 6,419,436 B1 | 7/2002 | Gaudron | |
| 6,431,510 B1 * | 8/2002 | Lydecker et al. | 248/216.1 |
| 6,435,789 B2 | 8/2002 | Gaudron | |
| 6,457,926 B1 | 10/2002 | Pope | |
| D473,451 S | 4/2003 | Goodman et al. | |
| D480,292 S | 10/2003 | Johansson et al. | |
| D480,625 S | 10/2003 | Snell | |
| D486,057 S | 2/2004 | Chen | |
| D493,699 S | 8/2004 | Goodman et al. | |
| D494,452 S | 8/2004 | Sheldon et al. | |
| 6,821,069 B2 | 11/2004 | Ikuta | |
| 6,830,228 B2 | 12/2004 | Ernst | |
| 6,884,012 B2 | 4/2005 | Panasik | |
| D515,911 S | 2/2006 | McDuff | |
| D516,412 S | 3/2006 | McDuff | |
| 7,160,074 B2 | 1/2007 | Ernst et al. | |
| D554,481 S | 11/2007 | Newbould et al. | |
| D554,483 S | 11/2007 | Hager et al. | |
| D557,595 S | 12/2007 | Ernst et al. | |
| D566,532 S | 4/2008 | Wolff | |
| 7,395,998 B2 | 7/2008 | Peterson | |
| 7,540,458 B2 * | 6/2009 | Forbes | 248/303 |
| 7,547,171 B2 | 6/2009 | McDuff | |
| D596,930 S | 7/2009 | Gaudron | |
| D607,311 S | 1/2010 | Snider | |
| 7,694,401 B2 | 4/2010 | Peterson | |
| 7,713,013 B2 | 5/2010 | Sedgwick et al. | |
| D626,403 S | 11/2010 | Portz | |
| D630,088 S | 1/2011 | Kim | |
| D630,089 S | 1/2011 | Kim | |
| D635,843 S | 4/2011 | McDuff et al. | |
| D636,256 S | 4/2011 | McDuff et al. | |
| 2001/0046429 A1 | 11/2001 | Gaudron | |
| 2007/0124910 A1 | 6/2007 | Peterson et al. | |
| 2007/0235622 A1 | 10/2007 | Baran et al. | |
| 2008/0253860 A1 | 10/2008 | McDuff et al. | |

FOREIGN PATENT DOCUMENTS

| | | |
|---|---|---|
| CA | 2458320 A1 | 8/2004 |
| CA | 2420718 | 9/2004 |
| CH | 491296 | 5/1970 |
| EP | 0713981 A1 | 5/1996 |
| WO | 96/02170 | 2/1996 |

(56) References Cited

FOREIGN PATENT DOCUMENTS

WO 96/16273 5/1996
WO 2004079209 A1 9/2004

OTHER PUBLICATIONS

International Search Report for PCT/CA2004/000311 mailed Jul. 14, 2004.
International Search Report for PCT/CA2006/000419 mailed Jul. 6, 2006.
International Search Report for PCT/CA2006/000428 mailed Jul. 13, 2006.
International Search Report for PCT/US2003/039974 mailed Jul. 16, 2004.
International Search Report for PCT/CA2009/001572 mailed Feb. 11, 2010.

* cited by examiner

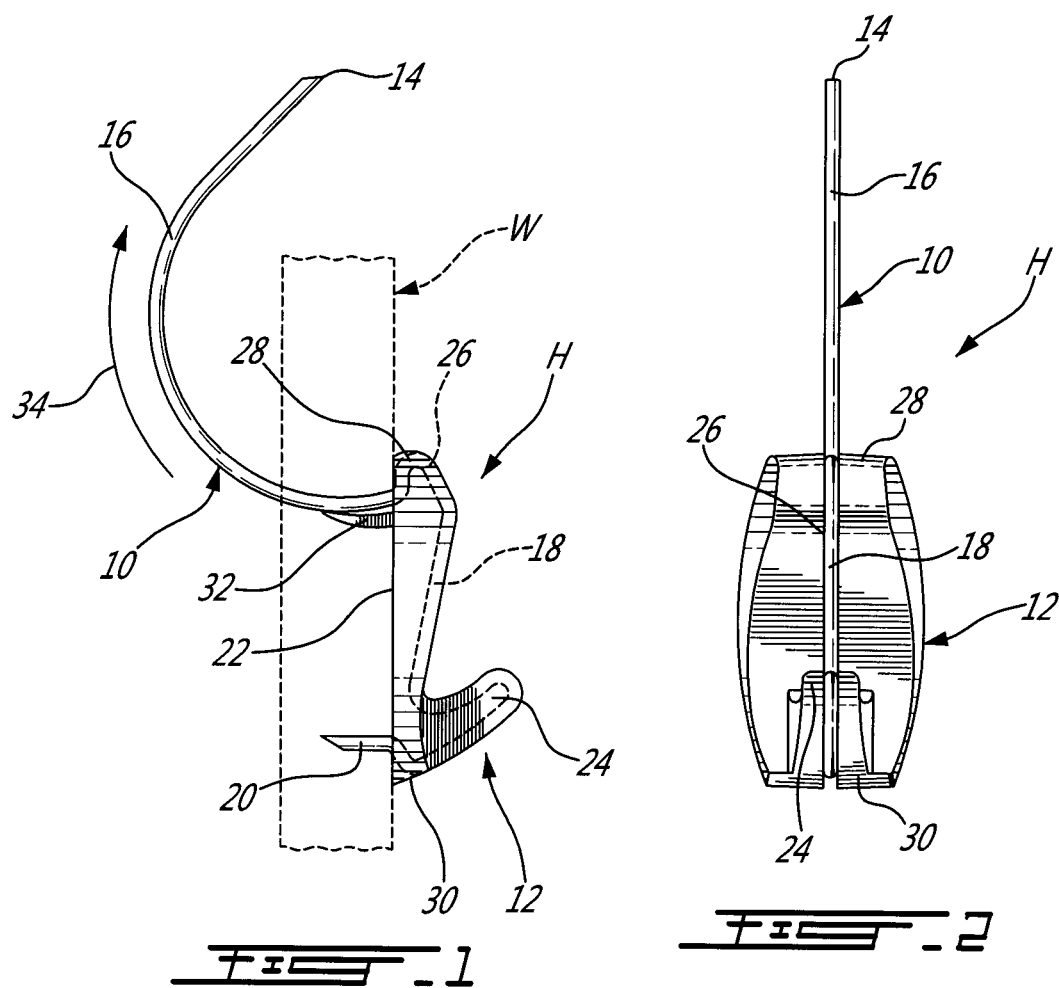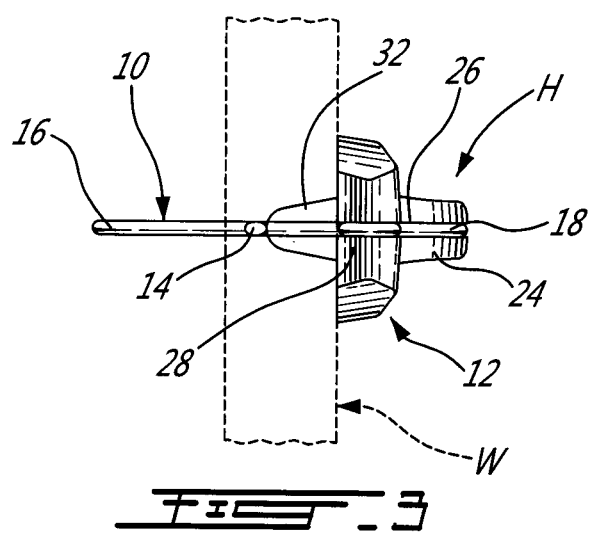

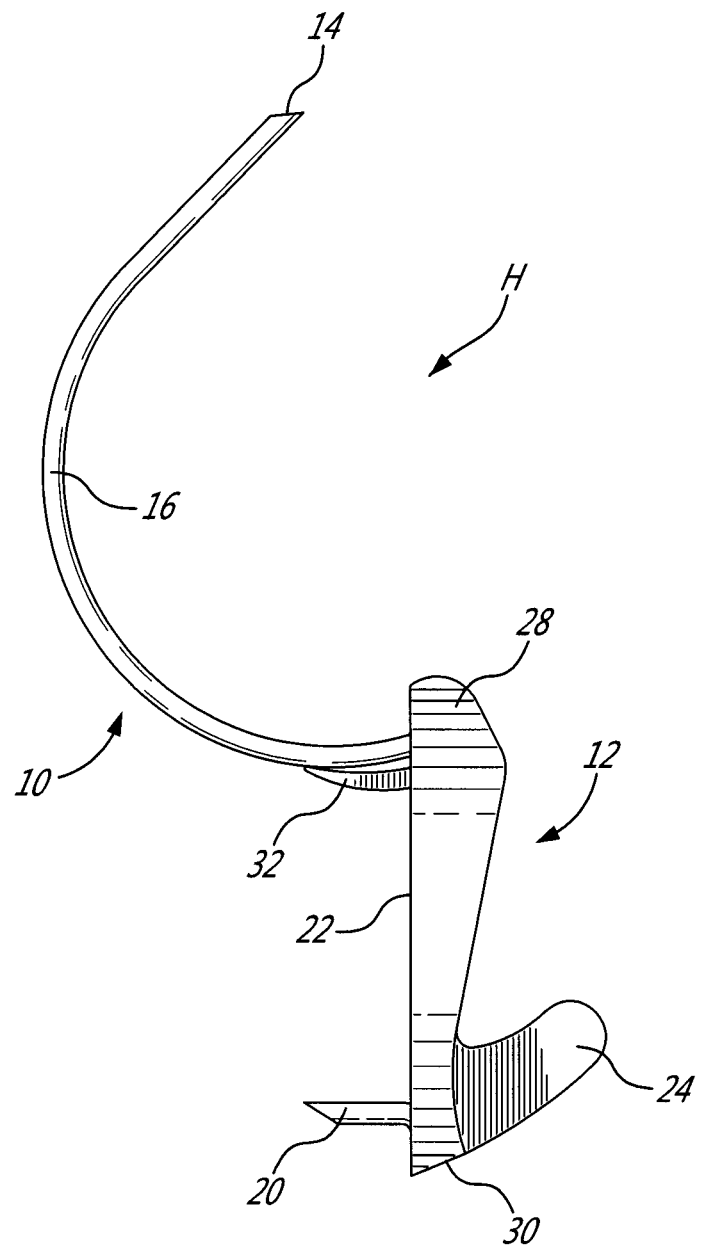

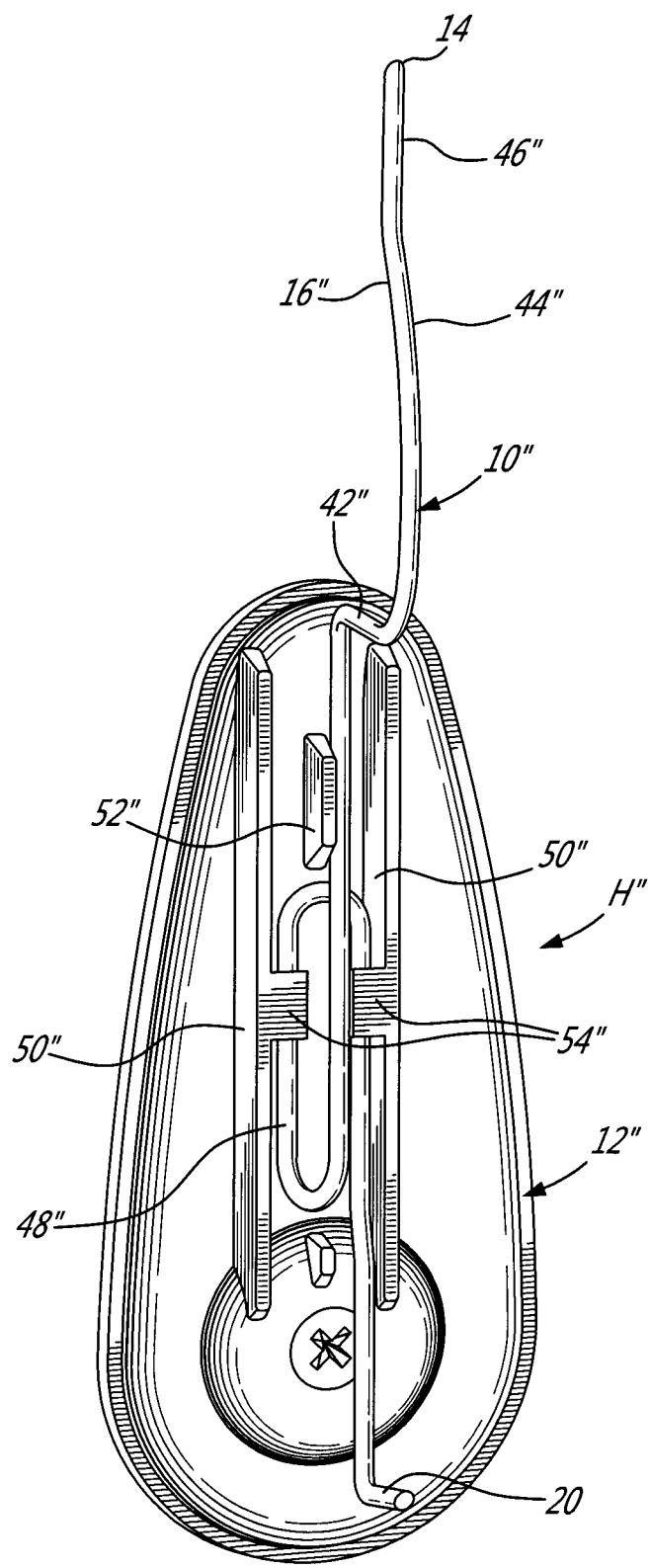

HANGER FOR HOLLOW WALLS

CROSS REFERENCE TO RELATED APPLICATIONS

This Application is a 371 National Phase filing from International Application No. PCT/CA2009/001669 filed on Nov. 18, 2009, which claims priority on U.S. Provisional Application No. 61/193,331 filed on Nov. 18, 2008, which is herein incorporated by reference.

FIELD OF THE INVENTION

The present invention relates to hangers for supporting objects on a wall and, more particularly, to a hanger having a hook portion and an anchor portion, for attachment to hollow walls, such as wallboards which typically comprise a relatively thick layer of gypsum sandwiched between paper layers.

BACKGROUND OF THE INVENTION

There are various wall anchors available on the market, including plastic inserts which are hammered in a hole previously defined in a wall, wherein a fastener, such as a screw, is then engaged in the plastic insert, causing it to expand such that the assembly of the insert and the fastener is set firmly in the wall.

Toggle bolts also exist, wherein rotation of a bolt causes wings to deploy behind the wall and to ultimately abut the inside of the wall thereby firmly anchoring the bolt to the wall.

Both these types of anchors necessitate that a hole be previously drilled in the wall. On the other hand, there exists wall anchors defining a pointed cutting end and large threads, which are adapted to, in a single step, be rotatively driven in the wall thereby drilling their own hole in the wall with the large threads of the anchor compacting the gypsum and becoming firmly set therein. These types of anchors must be installed by way of a screwdriver and typically by a power driven screwdriver bit.

U.S. Pat. No. 6,641,344 issued on Nov. 4, 2003 to Weiss discloses an anchoring device for hollow walls such that a fixture can be hanged from the wall. The anchoring device has an elongated body including a curvilinear portion and a pointed distal end. The device includes a fixture portion coupled to and extending from the elongated body and adapted to remain on the visible side of the wall for allowing the fixture to be hung therefrom.

In spite of these various devices, there remains a need for a wall-mounted hanger of the type described hereinafter.

SUMMARY OF THE INVENTION

It is therefore an aim of the present invention to provide a novel hanger for hollow structures, such as hollow walls.

It is also an aim of the present invention to provide a novel hanger for hollow walls, which can be installed by hand.

Therefore, in accordance with the present invention, there is provided an anchoring system for use with hollow panels, comprising an anchor member and a separate fixture, which are adapted to be mounted together, the anchor member including an elongated element adapted to be inserted into and partly through a hollow panel and to bear against a rear surface of the panel, the fixture being adapted to bear against a front surface of the panel thereby securing the anchoring system to the panel.

Also in accordance with the present invention, there is provided an anchoring system for use with hollow panels, comprising an anchor member and a fixture, the anchor member including upper and lower elongated elements adapted to be inserted into a hollow panel, the upper elongated element being adapted to extend past the panel and to bear against a rear surface of the panel, the fixture being adapted to bear against a front surface of the panel thereby securing the anchoring system to the panel.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which:

FIG. 1 is a left side elevational view of a hanger for hollow walls in accordance with a first embodiment of the present invention, wherein the hanger is shown mounted to a hollow wall that is shown in phantom lines;

FIG. 2 is a front elevational view of the hanger of FIG. 1, shown in isolation;

FIG. 3 is a top plan view of the hanger of FIG. 1;

FIG. 4 is a left side elevational view of the hanger, which is similar to FIG. 1, but wherein the hanger is shown in isolation;

FIG. 18 is a rear perspective view of a hanger for hollow walls in accordance with a fourth embodiment of the present invention.

DESCRIPTION OF ILLUSTRATIVE EMBODIMENTS OF THE INVENTION

Figure 5:
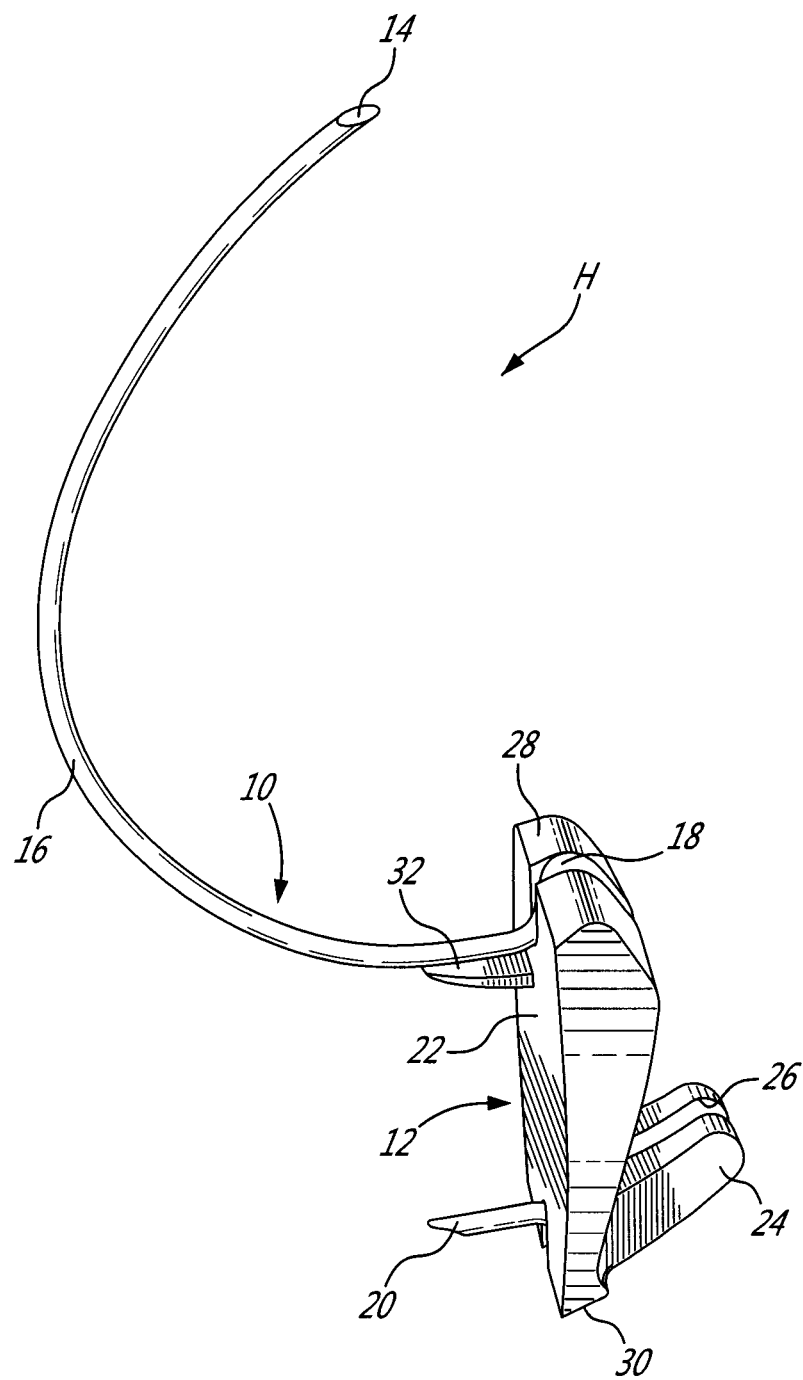
FIG. 5 is a rear perspective view of the hanger of FIG. 1 shown in isolation.
Figure 6:
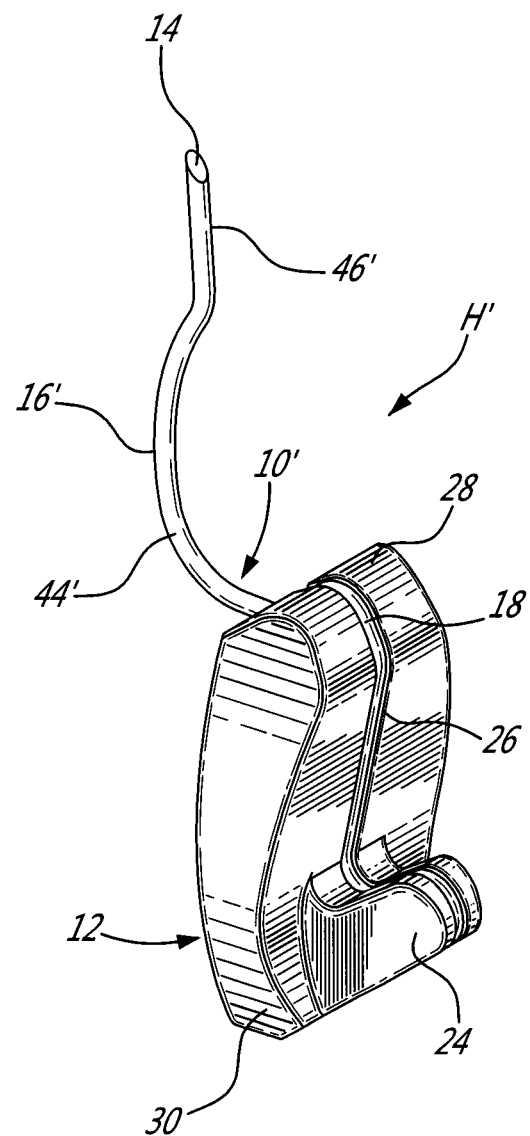
FIG. 6 is a front perspective view of a hanger for hollow walls in accordance with a second embodiment of the present invention.
Figure 7:
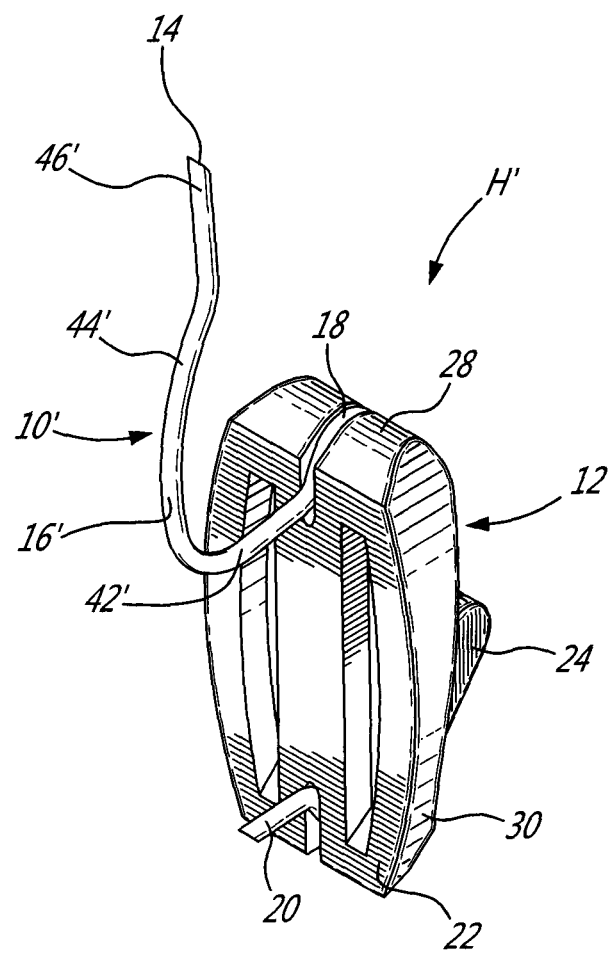
FIG. 7 is a rear perspective view of the hanger of FIG. 6.

Turning to the figures of the appended drawings, there are shown a number of anchoring systems or hangers, each comprising an anchor member adapted to be secured to a hollow structure, and a fixture (such a hook) adapted to be mounted to the anchor member. Such anchoring systems or hangers can be used on hollow walls, hollow doors, etc.

First, there is disclosed herein a hanger H for installation to hollow structures, in accordance with an embodiment of the present invention will be described. The hanger H is made of two components that are assembled together, namely an anchor member 10 and a hook member 12. The anchor member 10 comprises a formed wire having an upper pointed distal end 14, a curved portion 16, a hook-engaging portion 18, and a lower wall-engaging end pin or spike 20 adapted to engage the wall W.

The hook member 12, which is herein made of a plastics material, although other materials are suitable, defines a rear plane surface 22, a front hook 24 for suspending an item/fixture therefrom, and a groove 26 that follows the contour of the hook member 12, generally forwardly of the rear surface 24 and between upper and lower ends 28 and 30, respectively, of the hook member 12. The moulded profiled hook member 12 provides stability and a large flat contact surface 22 with the mounting surface, i.e. the visible surface of the hollow wall W.

The groove 26 of the hook member 12 and the hook-engaging portion 18 of the anchor member 10 generally coincide and appear in broken lines in FIG. 1. The hook-engaging portion 18 of the anchor member 10 is thus wrapped around the profile of the hook member 12 for providing additional strength to the hanger H. As part of the manufacturing process of the hanger H, the anchor member 10 can be snap fitted around the hook member 12 into the calibrated groove 26. Alternatively, the plastic or metal die cast hook member 12 can be over-moulded onto the anchor member 10. The anchor member 10 is shaped as to ease the assembly, but keep the hook member 12 captive while the anchor member 10 is being installed into the wall W.

The end spike 20 of the anchor member 10 extends rearwardly behind the rear surface 22 of the hook member 12 generally opposite the lower end 30, as seen in FIGS. 1, 4 and 5.

The hook member 12 also defines an upper spike 32 that extends rearwardly from the plane surface 22 generally opposite the upper end 28, as again best seen in FIGS. 1, 4 and 5. The upper spike 32, which is positioned herein slightly below the curved portion 16 of the anchor member 10, is adapted to penetrate the wall W.

To install the hanger H to the wall W, the hanger H is substantially positioned upside-down with respect to its position illustrated in FIG. 4, and the pointed distal end 14 is then inserted through the wall W while the hanger H is rotated along an upwards arcuate path dictated by the shape of the curved portion 16, generally as per arrow 34 in FIG. 1. Once the hook member 12 nears the wall W, the upper spike 32 of the hook member 12 and the lower spike 20 of the anchor member 10 penetrate the wall W, until the hanger H has reached its installed position illustrated in FIG. 1. Furthermore, the pointed distal end 14 of the anchor member 10 will penetrate the hidden surface of the wall W.

Indeed, at the end of the rotation movement of the hanger H, during the insertion of the curved portion 16 of the anchor member 10, the lower pin or spike 20 of the anchor member 10 will bite into the drywall, thus rotationally stabilising the assembly of the hanger H in the wall W and providing additional holding power as the load will now be distributed on the two spikes 20 and 32, and not only on the spike 32 of the hook member 12 (in addition to the load being also assumed by the section of the curved portion 16, which is lodged in the wall W).

The additional support provided by the spike 32 of the hook member 12 increases the supporting surface resting on the wall W and reinforces the wire anchor member 10 at the stress concentration point.

FIGS. 4 and 5 are further views of the hanger H in isolation.

Figure 8:
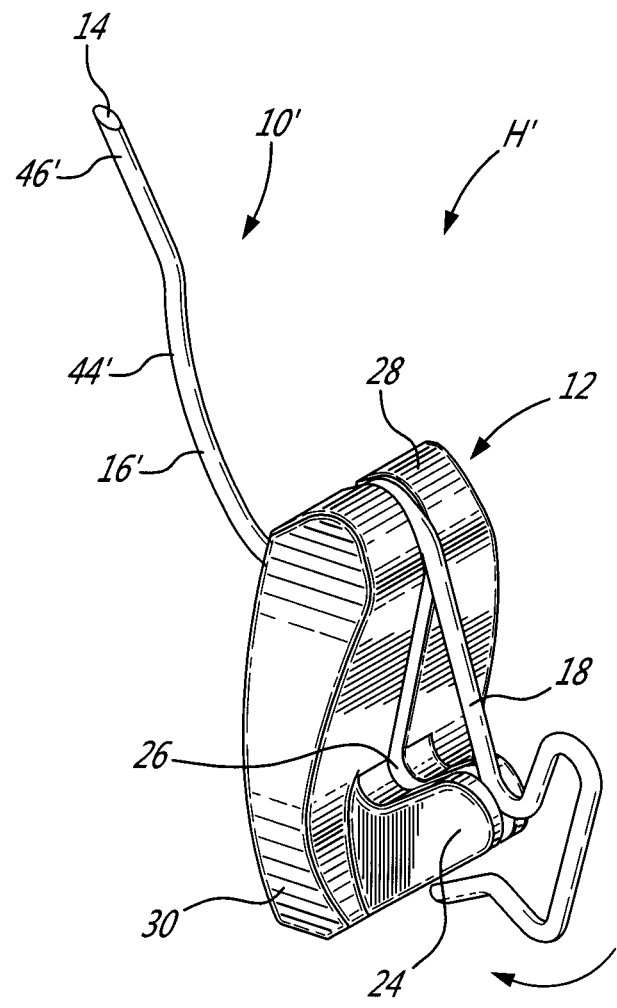
FIG. 8 is a front perspective view of the hanger of FIG. 6, but showing a wire anchor member thereof being assembled to a hook member thereof.
Figure 9:
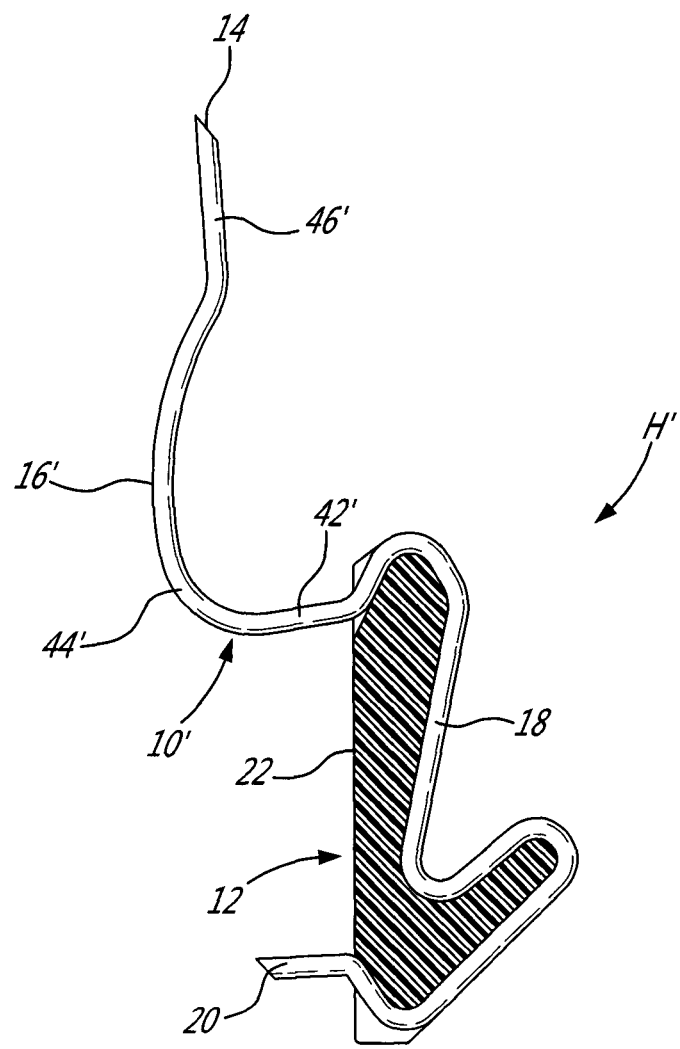
FIG. 9 is a vertical cross-sectional view of the hanger of FIG. 6.
Figure 10:
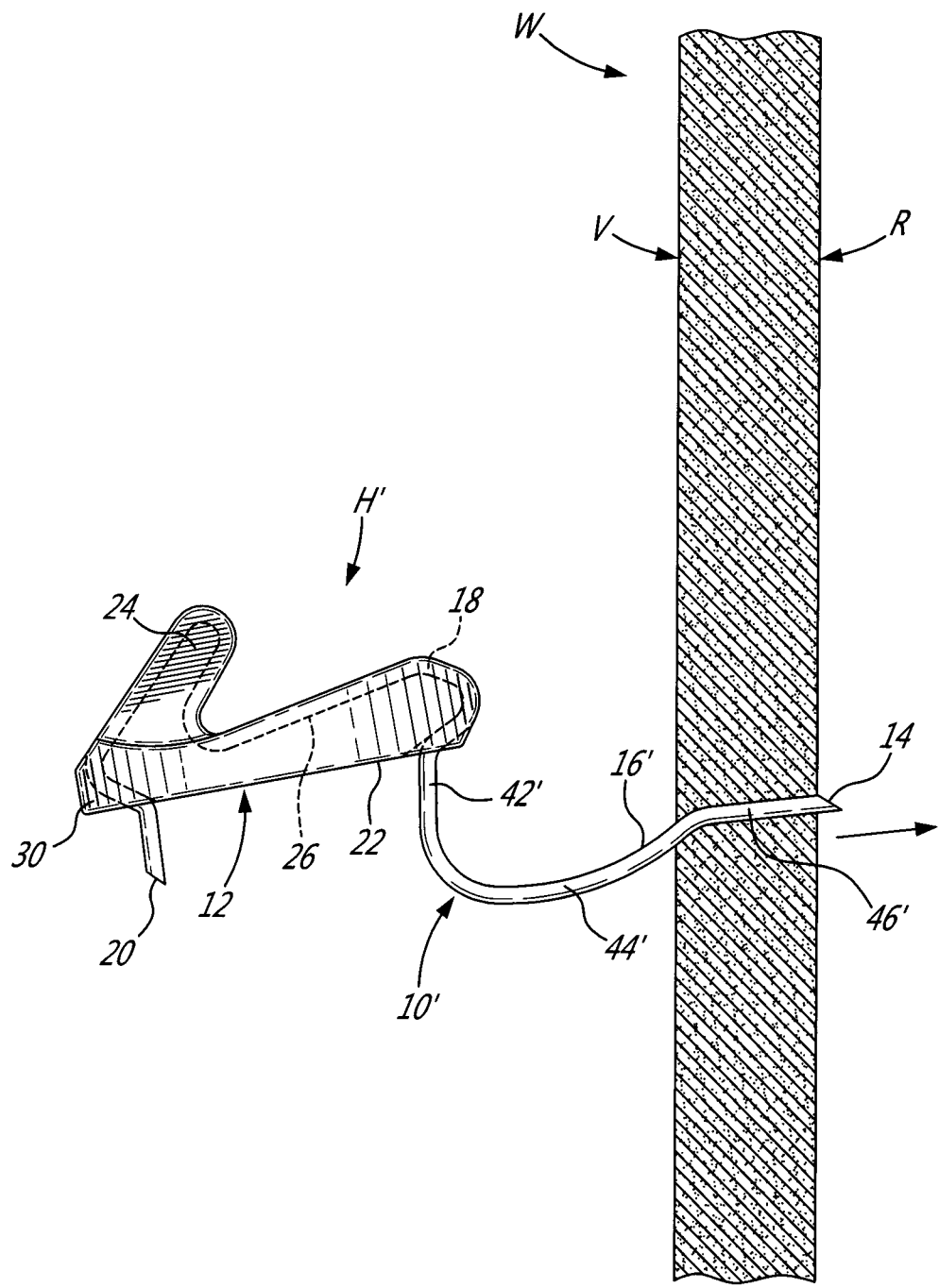
FIGS. 10 to 12 are successive partly cross-sectional side elevation views showing the installation of the wall anchor assembly of FIG. 6 into a wall.
Figure 11:
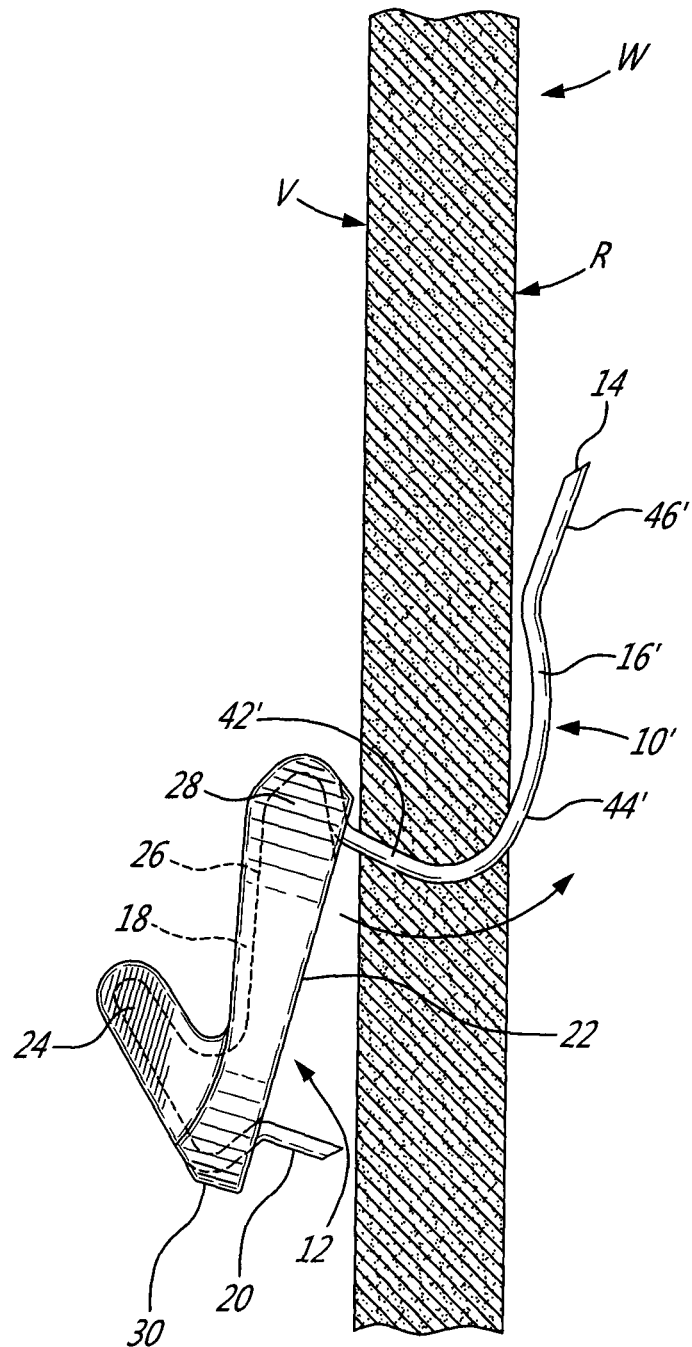
Figure 12:
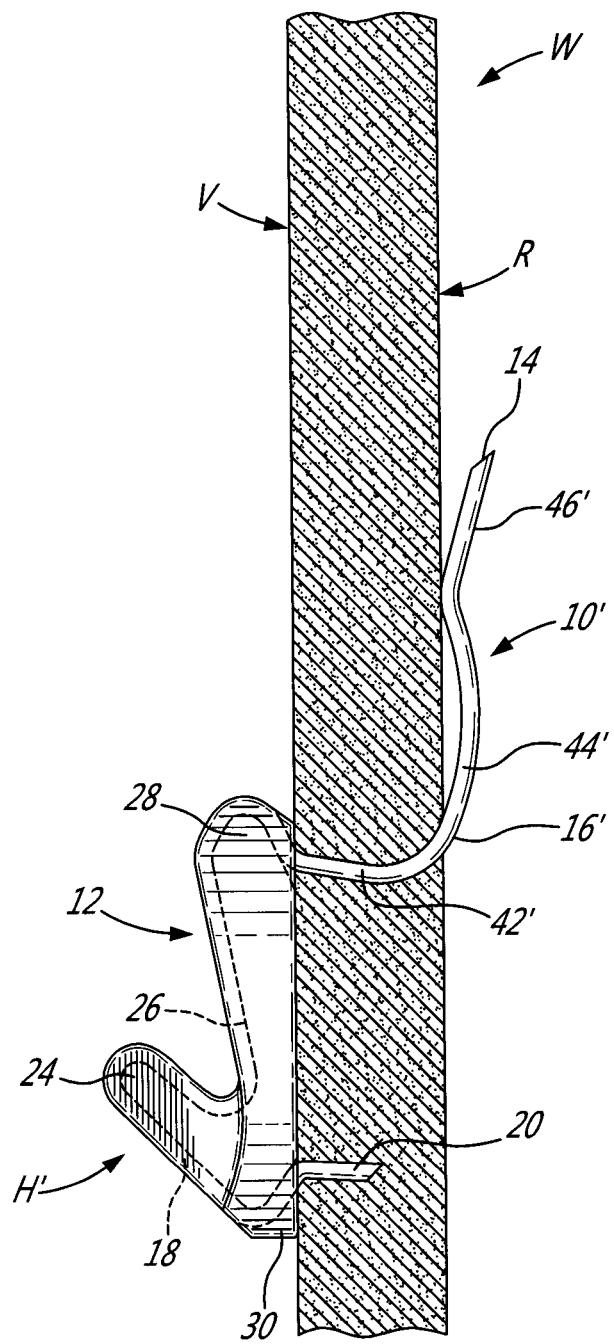
Figure 13:
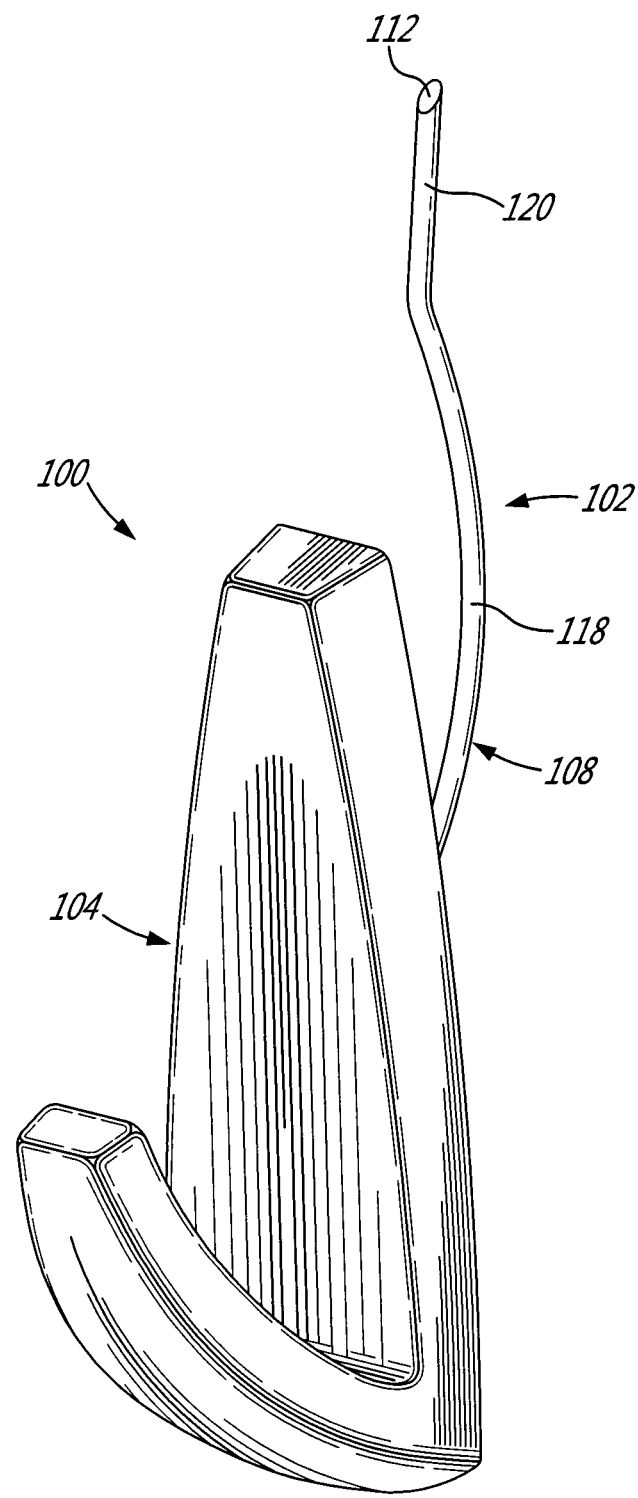
FIG. 13 is a front perspective view of a hanger for hollow walls in accordance with a third embodiment of the present invention.

Now turning to a variant hanger H', which is shown in isolation in FIGS. 6 to 9 and in successive assembly stages in FIGS. 10 to 12, it is noted that hanger H' has many similarities with hanger H of FIGS. 1 to 5.

The main differences between hangers H and H' are as follows. The hanger H' of FIGS. 6 to 9 does not include the upper spike 32 of hanger H; on the other hand, such a spike 32 could be embodied in hanger H'.

A more significant difference lies in that the shape of the anchor member 10' of hanger H', which is located upwardly and rearwardly of the upper end 28 of the hook member 12 is different than the shape of the corresponding curved portion 16 defined on the anchor member 10 of the hanger H of FIGS. 1 to 5. Indeed, in hanger H', the wall-engaging upper portion 16' of the anchor member 10', which extends between the distal end 14 and the hook-engaging portion 18 of the anchor member 10', defines as best seen in FIG. 9, a first substantially straight section 42' that is close to being horizontal, a second curved section 44', and a third straight section 46' that is close to being vertical and merges with the distal end 14.

Once installed in the wall W, as seen in FIG. 12, the first section 42' of the wall-engaging upper portion 16' of the anchor member 10' is lodged in the wall material and provides a bearing surface that assists in the hanger H' supporting a load applied on the hook member 12. Also when installed, the third section 46' of the wall-engaging upper portion 16' bears against a rear, i.e. non-visible, surface R of the wall W, whereby as opposed to the hanger H of FIGS. 1 to 5, the distal end 14 of hanger H' of FIGS. 6 to 12 does not penetrate the wall W. This increases the load that be handled by the hanger H' and also its rigidity. It is noted that when a sufficient load is applied onto the hanger H' (typically via the hook member 12 thereof), the third section 46' is solicited forwardly, i.e. towards the wall W, thereby providing a further bearing surface of the hanger H' on the wall material.

In hanger H', the anchor member 10' is snap fitted around the hook member 12 into the calibrated groove 26, and this is seen in FIG. 8 that shows the anchor member 10' being installed onto the hook member 12 in such a way that its spring bias wraps the anchor member 10' tightly around the hook member 12 such as to ensure that the hook member 12 is held captive to the anchor member 10' while the latter is being installed into the wall W. It is noted that the installation of the anchor member 10' onto the hook member 12 can be reversed with respect to what is shown in FIG. 8, in that the lower section of the hook-engaging portion 18 of the anchor member 10', that is the section thereof located adjacent the end spike 20, is first engaged into the groove 26 of the hook member 12, before the upper portion of the hook-engaging portion 18, which is located adjacent the wall-engaging upper portion 16' of the anchor member 10', is forced about the upper end 28 of the hook member 12 and then allowed to snap into the groove 26.

FIGS. 10 to 12 show the installation of the hanger H' in the wall W, wherein in a way similar to the installation of hanger H (although hanger H' does not have to be reversed as much as hanger H), the pointed distal end 14 is inserted substantially translationally through the wall W (see FIG. 10). The hanger H' is then pivoted so that the wall-engaging portion 16' is rotated upwards, as seen in FIG. 11. Once the hook member 12 nears the wall W, the lower end spike 20 of the anchor member 10' penetrates the wall W, until the hanger H' has reached its installed position illustrated in FIG. 12.

The hanger H', once installed, bears against the wall material via inter alia the lower end spike 20 (lodged in the wall W), the first section 42' of the wall-engaging upper portion 16' of the anchor member 10' (also lodged in the wall W), the third section 46' of the wall-engaging upper portion 16' (which is applied against the rear surface R of the wall W), and the rear surface 22 of the hook member 12 (which bears against the visible surface V of the wall W). This arrangement provides significant holding power as the load is distributed on various surfaces of the hanger H' interacting with the wall W.

FIG. 18 illustrates a variant hanger H" of hanger H' of FIGS. 6 to 12. In Hanger H", the anchor member 10", once the hanger H" is installed on the wall, is completely hidden. Indeed, the anchor member 10" is attached behind the hook member 12". Specifically, the hook-engaging portion 18" of the anchor member 10" forms a loop 48" that is engaged to the hook member 12" via retaining elements 50" and 52" provided on the shallow hidden side of the hook member 12". More particularly, the two retaining elements 50" include two elongated and parallel arms, the retaining elements 50" each defining an inwardly extending retaining tab 54". The retaining element 52" takes the form of a guide provided between the two retaining elements 50". The hook-engaging portion 18" of the anchor member 10" is held captive to the hook member 12" in that it extends behind the tabs 54" and between the arms of the retaining elements 50". The hook-engaging portion 18" also extends between the arm of one of the retaining elements 50" and the retaining element 52". The hook-engaging portion 18" can be spring biased into this captive position or can be crimped to the hook member 12". Other attachment methods can be obviously contemplated.

The hanger H" is installed to the wall in a way similar as hanger H' (FIGS. 10 to 12), as the wall-engaging portion 16", the distal end 14 and the lower end spike 20 of the anchor member 10" of the hanger H" are similar to corresponding parts of hanger H'.

Figure 14:
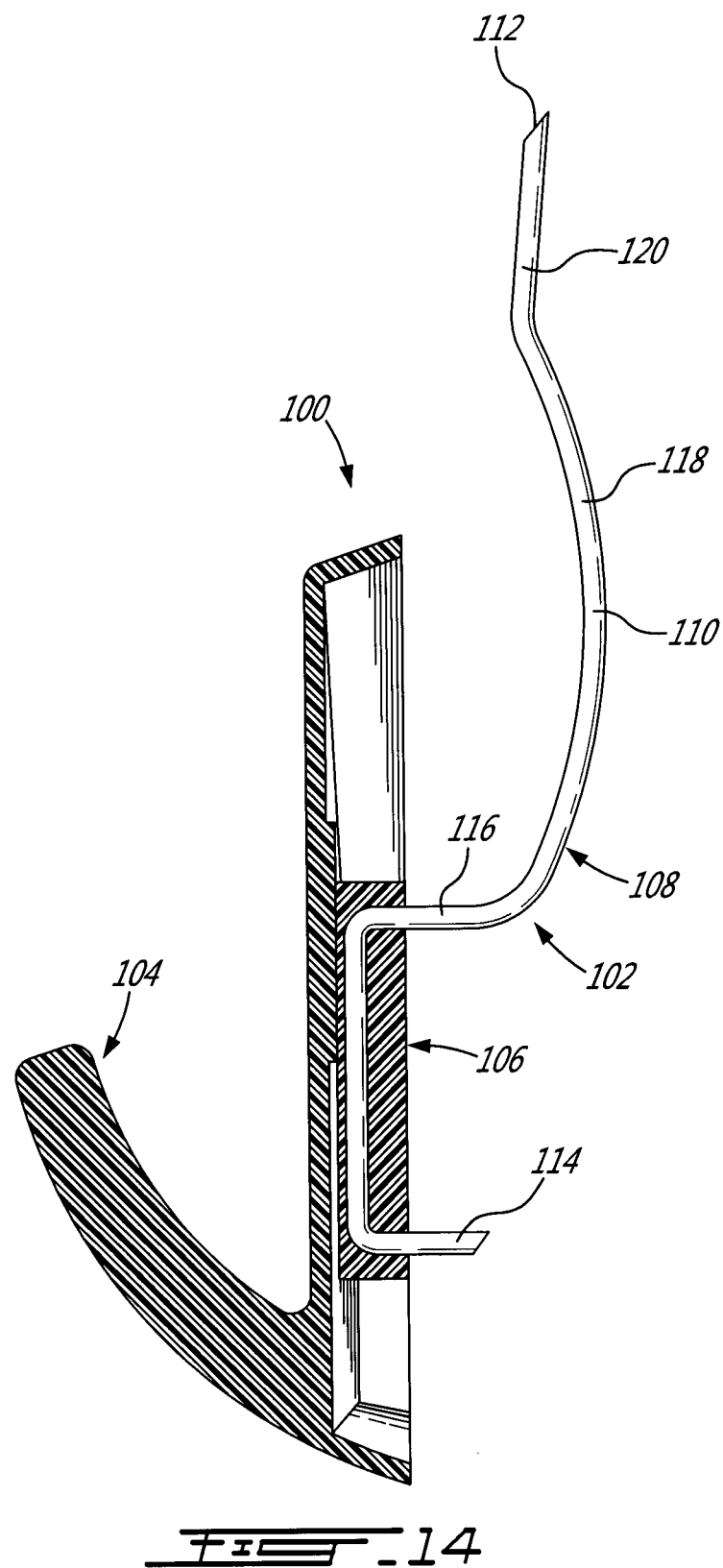
FIG. 14 is a vertical cross-sectional view of the hanger of FIG. 13.
Figure 15:
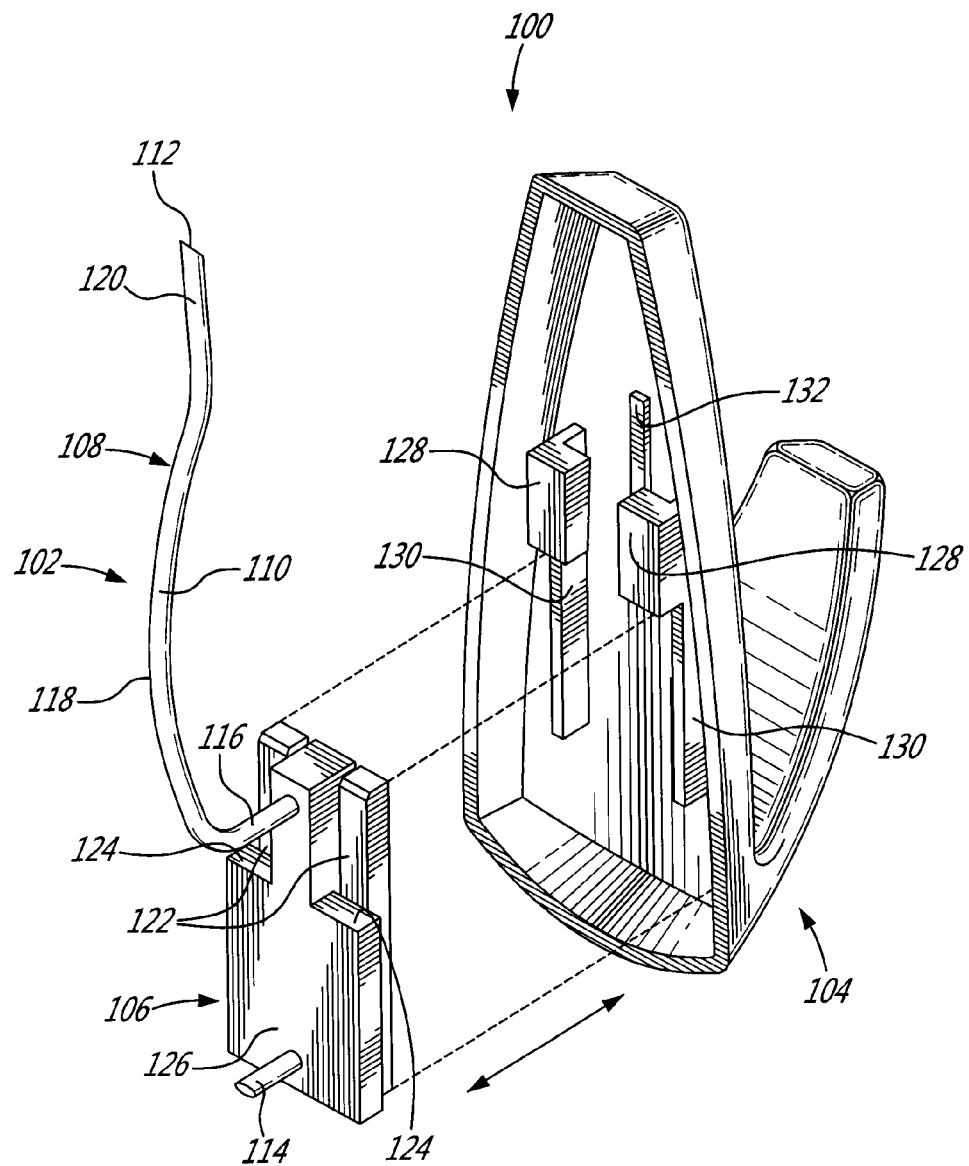
FIGS. 15 to 17 are successive rear perspective views of the hanger of FIG. 13, showing the assembly of an anchor member thereof to a hook member thereof.

In FIGS. 13 to 17, there is shown a further hanger 100 that includes an anchor member 102 and a hook member 104. As best seen in FIGS. 14 and 15, the anchor member 102 is made of two components, namely a support member or plate 106 (for instance made of a plastics material) and an anchoring wire 108, both these components being firmly secured together (see FIG. 15). The wire 108 has a wall-engaging portion 110, a distal end 112 and a lower end spike 114 that are similar to the wall-engaging portion 16', the distal end 14 and the lower end spike 20 of the anchor member 10' of the hanger H' of FIGS. 6 to 12. The wall-engaging portion 110 extends more than the corresponding wall-engaging portion 16', but these shapes could be interchanged depending, for instance, on installation parameters.

The wall-engaging portion 110 includes, as in hanger H', a first substantially straight section 116 that is substantially horizontal, a second curved section 118, and a third straight section 120 that is close to being vertical and merges with the distal end 112. This allows the anchor member 102 to be mounted to the wall in a way similar to hanger H' of FIGS. 6 to 12. As for the hanger H" of FIG. 18, anchor member 102 of the hanger 100, once the installation has been competed on the wall, is hidden.

Referring to FIG. 15, the support plate 106 includes a pair of vertical and parallel guide recesses 122, which each define a support surface 124. The wire 108 extends on a raised section 126 that borders the two recesses 122. The hook member 104 includes in its hollowed configuration a pair of vertically extending and parallel L-shaped male elements 128 and a pair of vertically extending and parallel guides 130. A vertical rib 132 extends between the male elements 128 and the guides 130.

Figure 16:
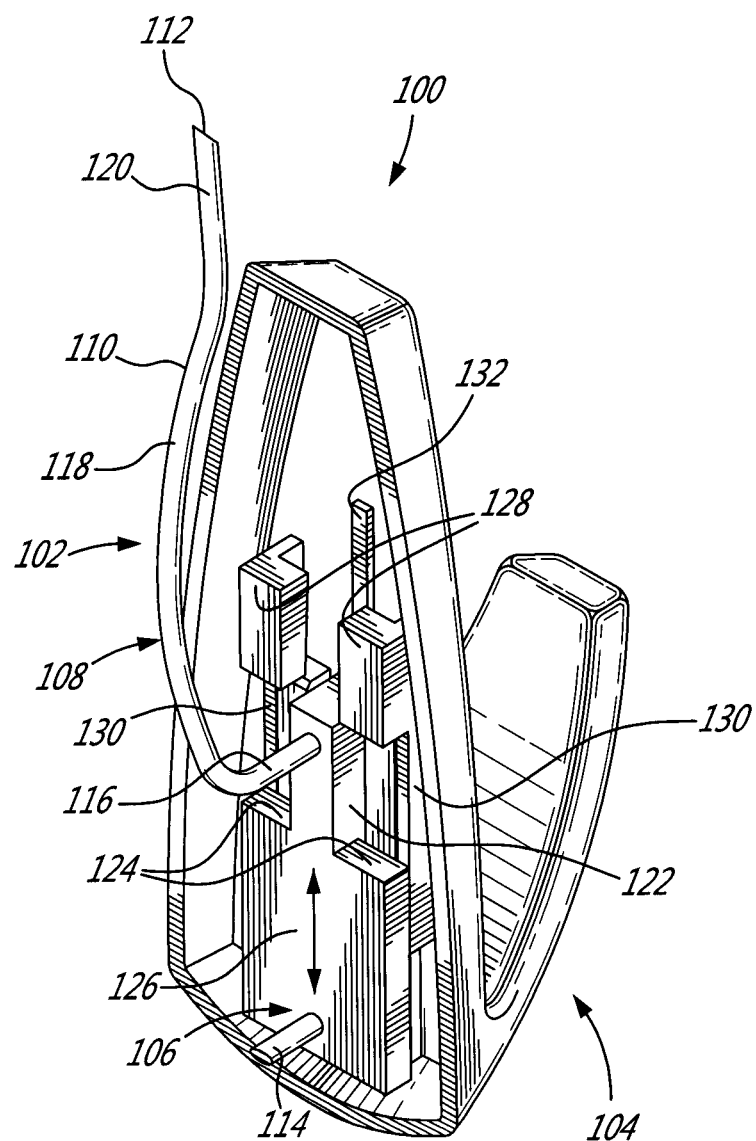
Figure 17:
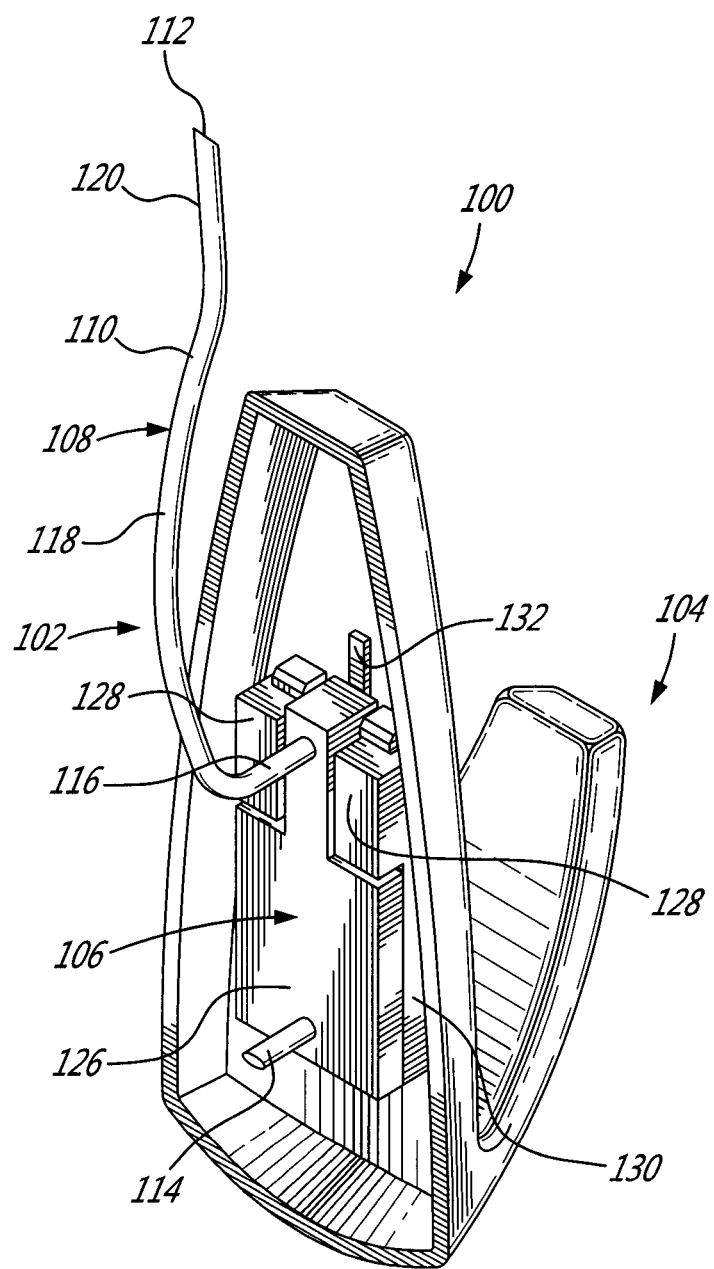

As seen in FIGS. 15 to 17, the hook member 104 is engaged to the support plate 106 by first translationally bringing these two components together in an aligned way such that the plate 106 is brought under the male elements 128 (see FIGS. 15 and 16). The plate 106 is then slid vertically relative to the hook member 104 such that the L-shaped male elements 128 of the latter engage the recesses 122 of the former, until the L-shaped male elements 128 are supported by surfaces 124 of the support plate 106 (see FIG. 17). The raised rib 132 biases the support plate 106 in tight fit engagement with the hook member 104; indeed, in the assembled position of FIG. 17, the support plate 106 is imprisoned between the rib 132 and the L-shaped male elements 128.

The anchor member 102 can be installed to the wall prior to the hook member 104 being slidably engaged to the support plate 106. Alternatively, the anchor member 102 and the hook member 104 can be engaged together before this assembly is mounted to the wall.

All of the hangers herein described can typically be installed by hand and do not produce much damage to the wall.

Although the present invention has been described hereinabove by way of embodiments thereof, it may be modified, without departing from the nature and teachings of the subject invention as described herein.

The invention claimed is:

1. An anchoring system for use with a hollow panel, comprising an anchor member and a separate fixture, which are adapted to be mounted together, the anchor member including an elongated element adapted to be inserted into and partly through a hollow panel and to bear against a rear surface of the panel, the fixture being adapted to bear against a front surface of the panel thereby securing the anchoring system to the panel, a front of the fixture defining a forwardly-facing groove and the anchor member being adapted to extend in the groove, the fixture including a hook and the groove being defined in at least part of the hook.

2. The anchoring system according to claim 1, wherein the elongated element extends substantially vertically.

3. The anchoring system according to claim 1, wherein the anchor member includes an elongated wire.

4. The anchoring system according to claim 1, wherein the anchor member includes at a lower end thereof a rearwardly extending element adapted to engage the panel.

5. The anchoring system according to claim 4, wherein the rearwardly extending element includes a spike.

6. The anchoring system according to claim 5, wherein the spike extends substantially horizontally.

7. The anchoring system according to claim 4, wherein the rearwardly extending element is located adjacent a lower end of the fixture.

8. The anchoring system according to claim 1, wherein the anchor member includes in succession from top to bottom: an upper distal end, a panel-engaging portion, a fixture-engaging portion and a lower panel-engaging portion.

9. The anchoring system according to claim 8, wherein the upper distal end is adapted to engage a rear surface of the panel, the panel-engaging portion is adapted to be at least partly lodged in the panel, the fixture-engaging portion is adapted to be joined to the fixture, and the lower panel-engaging portion is adapted to penetrate the panel.

10. The anchoring system according to claim 9, wherein the panel-engaging portion includes a section that extends behind the panel and at a distance therefrom.

11. The anchoring system according to claim 9, wherein the panel-engaging portion includes a section that extends substantially horizontally through the wall and between the upper distal end and the fixture-engaging portion.

12. The anchoring system according to claim 1, wherein the anchor member extends forwardly of the fixture so that, when the anchoring system is installed to the panel, the fixture at least partly extends between the anchor member and the panel.

13. The anchoring system according to claim 12, wherein the anchor member is adapted to engage the panel near upper and lower ends of the fixture and therebetween to extends along the front of the fixture.

14. The anchoring system according to claim 1, wherein the anchor member is releasably snap-fittingly engaged in the groove.

15. The anchoring system according to claim 1, wherein the anchor member is biasedly mounted to the fixture at the upper and lower ends thereof.

16. The anchoring system according to claim 1, wherein an upper end of the anchor member is adapted to penetrate the rear surface of the panel.

17. The anchoring system according to claim 1, wherein the groove extends from an upper end of the fixture to a lower end thereof, the anchor member extending in the groove and wrapping around at least the front of the fixture between the upper and lower ends thereof.

18. The anchoring system according to claim 17, wherein at the upper and lower ends of the fixture and behind the fixture, upper and lower sections of the anchor member, which are located adjacent the upper and lower ends of the fixture, extend respectively downwardly and upwardly before penetrating the panel.

19. The anchoring system according to claim 17, wherein the groove extends substantially vertically along the fixture.

20. The anchoring system according to claim 17, wherein the hook is provided between the upper and lower ends of the fixture.

21. An anchoring system for use with a hollow panel, comprising an anchor member and a separate fixture, which are adapted to be mounted together, the anchor member including an elongated element adapted to be inserted into and partly through a hollow panel and to bear against a rear surface of the panel, the fixture being adapted to bear against a front surface of the panel thereby securing the anchoring system to the panel, the fixture being provided with a rearwardly extending spike adapted to engage the panel, the rearwardly extending spike being located adjacent an upper end of the fixture, the fixture including a hook and the groove being defined in at least part of the hook.

22. The anchoring system according to claim 21, wherein the rearwardly extending spike extends adjacent a portion of the anchor member that extends through the panel.

23. An anchoring system for use with a hollow panel, comprising an anchor member and a separate fixture, which are adapted to be mounted together, the anchor member including an elongated element adapted to be inserted into and partly through a hollow panel and to bear against a rear surface of the panel, the fixture being adapted to bear against a front surface of the panel thereby securing the anchoring system to the panel, wherein the anchor member extends rearwardly of the fixture with a section of the anchor member not extending in the wall being hidden in a hollowed rear portion of the fixture such that when the anchoring system is installed, the anchor member is not visible, the section of the anchor member being located in the hollowed portion is adapted to be mounted to the fixture, the anchor member including a support plate adapted to be secured to the panel and to be joined to the fixture in the hollowed portion thereof, the fixture being adapted to be slidably connected to the support plate, the fixture and support plate being provided with cooperating elements adapted to mate such that the fixture is adapted to be suspended from the support plate, the cooperating elements including guides and a male and female engagement such that the fixture is secured to the support plate, the fixture including a rib adapted to bias the cooperating elements together in a tight engagement.

24. The anchoring system according to claim 23, wherein the anchor member includes an elongated wire, the support plate being adapted to be secured to the panel via the elongated wire that extends from the support plate at upper and lower ends thereof and that penetrates the panel near the upper and lower ends of the support plate.

25. An anchoring system for use with hollow panels, comprising an anchor member and a fixture, the anchor member including upper and lower elongated elements adapted to be inserted into a hollow panel, the upper elongated element being adapted to extend past the panel and to bear against a rear surface of the panel, the fixture being adapted to bear against a front surface of the panel thereby securing the anchoring system to the panel, a front of the fixture defining a forwardly-facing groove and the anchor member being adapted to extend in the groove, the fixture including a hook and the groove being defined in at least part of the hook.

26. The anchoring system according to claim 25, wherein the upper and lower elongated elements are adapted to engage the panel adjacent upper and lower ends of the fixture.

27. The anchoring system according to claim 25, wherein the anchor member comprises an elongated wire.

28. The anchoring system according to claim 25, wherein the groove extends from an upper end of the fixture to a lower end thereof, the anchor member extending in the groove and wrapping around at least the front of the fixture between the upper and lower ends thereof.

29. The anchoring system according to claim 28, wherein the groove extends substantially vertically along the fixture.

30. The anchoring system according to claim 28, wherein the hook is provided between the upper and lower ends of the fixture.

* * * * *